United States Patent
Yang et al.

(10) Patent No.: US 8,004,862 B2
(45) Date of Patent: Aug. 23, 2011

(54) OFFLINE SYNCHRONOUS RECTIFYING CIRCUIT WITH CURRENT TRANSFORMER FOR SOFT SWITCHING POWER CONVERTERS

(75) Inventors: Ta-Yung Yang, Milpitas, CA (US); Chou Sheng Wang, Keelung (TW); Wei Li Hsu, Keelung (TW)

(73) Assignee: System General Corp., Taipei (TW)

( * ) Notice: Subject to any disclaimer, the term of this patent is extended or adjusted under 35 U.S.C. 154(b) by 423 days.

(21) Appl. No.: 12/036,997

(22) Filed: Feb. 25, 2008

(65) Prior Publication Data

US 2009/0213628 A1  Aug. 27, 2009

(51) Int. Cl.
*H02M 3/335* (2006.01)
*H02M 5/42* (2006.01)

(52) U.S. Cl. ............ 363/21.06; 363/21.14; 363/89

(58) Field of Classification Search .......... 363/20, 363/21.01, 21.1, 21.12–21.14, 84, 89, 21.04–21.18
See application file for complete search history.

(56) References Cited

U.S. PATENT DOCUMENTS

| | | | | |
|---|---|---|---|---|
| 4,111,639 A * | 9/1978 | Matthews | | 431/25 |
| 5,757,173 A * | 5/1998 | Agiman | | 323/282 |
| 6,204,751 B1 * | 3/2001 | Bolda et al. | | 340/286.02 |
| 6,462,965 B1 * | 10/2002 | Uesono | | 363/21.14 |
| 6,813,166 B1 * | 11/2004 | Chang et al. | | 363/21.14 |
| 7,116,090 B1 * | 10/2006 | Yang et al. | | 323/288 |
| 7,173,835 B1 * | 2/2007 | Yang | | 363/89 |
| 2006/0072349 A1 * | 4/2006 | Lin | | 363/21.06 |
| 2008/0088289 A1 * | 4/2008 | Fogg et al. | | 323/283 |
| 2008/0088292 A1 * | 4/2008 | Stoichita et al. | | 323/285 |

* cited by examiner

*Primary Examiner* — Adolf Berhane
*Assistant Examiner* — Jeffrey Gblende

(57) ABSTRACT

A synchronous rectifying circuit of soft switching power converter is provided to improve the efficiency. The integrated synchronous rectifier includes a power transistor connected from a transformer to the output of the power converter for rectifying. A controller having a latch circuit generates a drive signal to control the power transistor in response to a switching-current signal. A current transformer generates the switching-current signal in response to the switching current of the transformer. The controller turns off the power transistor when the switching-current signal is lower than a second threshold. The power transistor is turned on once the switching-current signal is higher than a first threshold. Furthermore, a pulse-width detection circuit generates a pulse signal coupled to disable the drive signal and turn off the power transistor.

12 Claims, 12 Drawing Sheets

US 8,004,862 B2

OFFLINE SYNCHRONOUS RECTIFYING CIRCUIT WITH CURRENT TRANSFORMER FOR SOFT SWITCHING POWER CONVERTERS

BACKGROUND OF THE INVENTION

1. Field of the Invention

The present invention relates to power converters, and more particularly, relates to a synchronous rectifying circuit of the soft switching power converters.

2. Description of Related Art

FIG. 1 shows a circuit schematic of a conventional soft switching power converter. The soft switching power converter includes a transformer 10 to provide isolation from input voltage $V_{IN}$ to output voltage $V_O$ of the power converter for safety. Two switches 111 and 112 develop a half bridge circuit 11 to switch a resonant tank 12 and the transformer 10. The resonant tank 12 includes an inductor 121 and a capacitor 122. The inductor 121 can be an inductance device or the leakage inductance of a primary winding $N_P$ of the transformer 10. The inductance L of the inductor 121 and the capacitance C of the capacitor 122 determine the resonance frequency $f_0$ of the resonant tank 12 as follows equation.

$$f_0 = \frac{1}{2\pi\sqrt{L \times C}} \quad (1)$$

The transformer 10 transfers the energy from the primary winding $N_P$ to the secondary windings $N_{S1}$, $N_{S2}$ of the transformer 10. Two rectifiers 13, 14 and a capacitor 15 perform the rectifying and filter to the transformer 10 for generating the DC output voltage $V_O$ at the output of the power converter. The detail skill of the soft switching power converter can be found in text book 'Resonant Power Converters' by Marian K. Kazimierczuk and Dariusz Czarkowski, 1995 by John Wiley & Sons, Inc.

Although the soft switching of the power converter achieves high efficiency and low EMI (electric-magnetic interference) performance, the forward voltage of rectifiers 13 and 14 still causes significant power losses. Using transistors as the synchronous rectifiers is a higher efficiency approach, such as 'Control circuit associated with saturable inductor operated as synchronous rectifier forward power converter' by Yang, U.S. Pat. No. 7,173,835. However, the disadvantage of this prior art is additional power consumptions caused by saturable inductors, etc.

SUMMARY OF THE INVENTION

An objective of the invention is to provide an offline synchronous rectifying circuit with current transformer for soft switching power converters to improve the efficiency of the power converter.

A synchronous rectifying circuit of a soft switching power converter includes a power transistor, a diode, a controller and a current transformer. The diode connects to a transformer and the output of the power converter for rectifying. The controller having a latch circuit generates a drive signal to control the power transistor in response to a switching-current signal. The current transformer generates the switching-current signal in response to the switching current of the transformer. A start signal is generated when the switching-current signal is higher than a first threshold. A stop signal is generated when the switching-current signal is lower than a second threshold. The controller turns off the power transistor when the stop signal is generated or the diode is reversely biased. The power transistor is turned on once the start signal is enabled and the diode is forward biased. A maximum-on-time circuit of the controller is utilized to limit the maximum on-time of the power transistor. An inner-lock circuit of the controller generates an inner-lock signal in response to the enablement of the drive signal. The drive signal only can be initiated once the inner-lock signal is disabled. Furthermore, a pulse-width detection circuit generates a pulse signal to disable the drive signal and turn off the power transistor. An integration signal is generated in accordance with the period of the start signal and the stop signal. A ramp signal is generated and ramping up in response to the start signal. The pulse signal is generated by comparing the integration signal and the ramp signal.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention. In the drawings.

DESCRIPTION OF THE PREFERRED EMBODIMENTS

Figure 1:
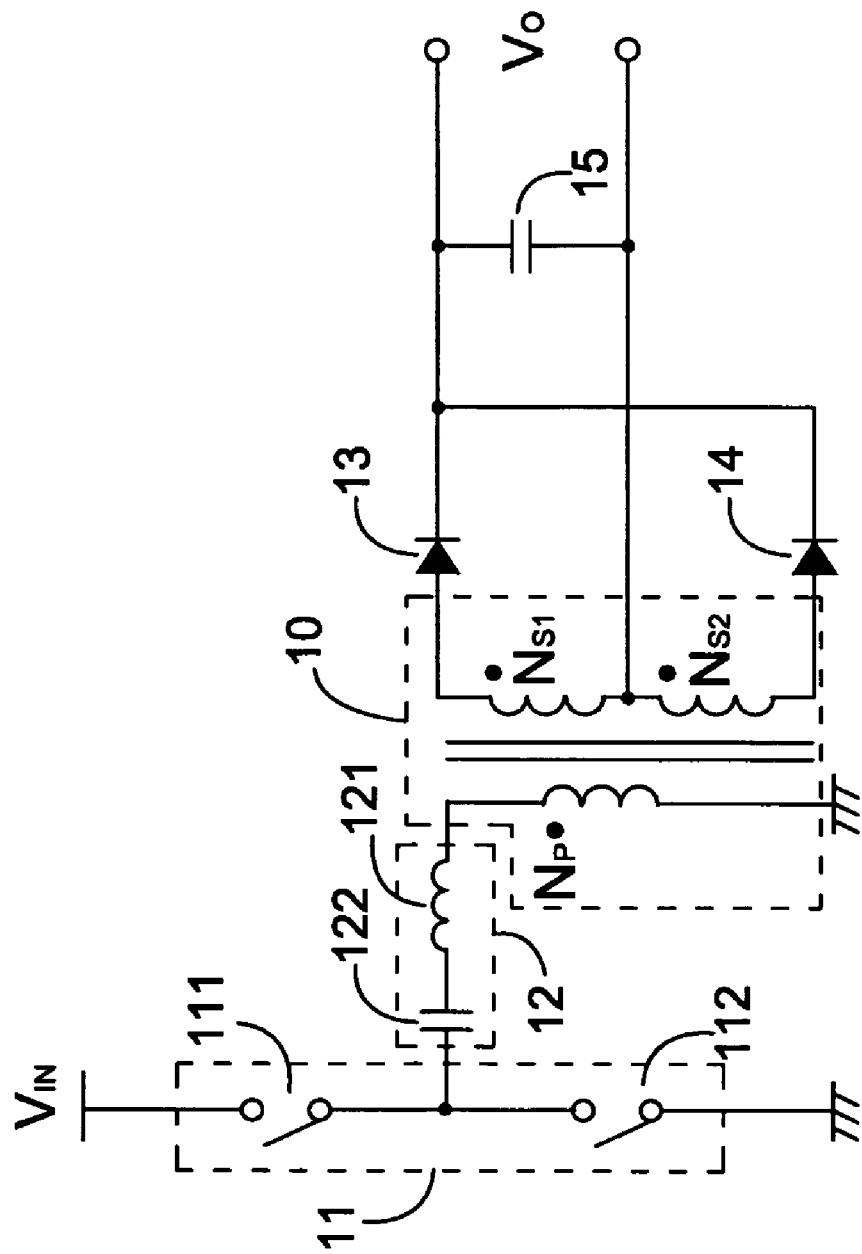
FIG. 1 shows a circuit schematic of a conventional soft switching power converter.
Figure 2:
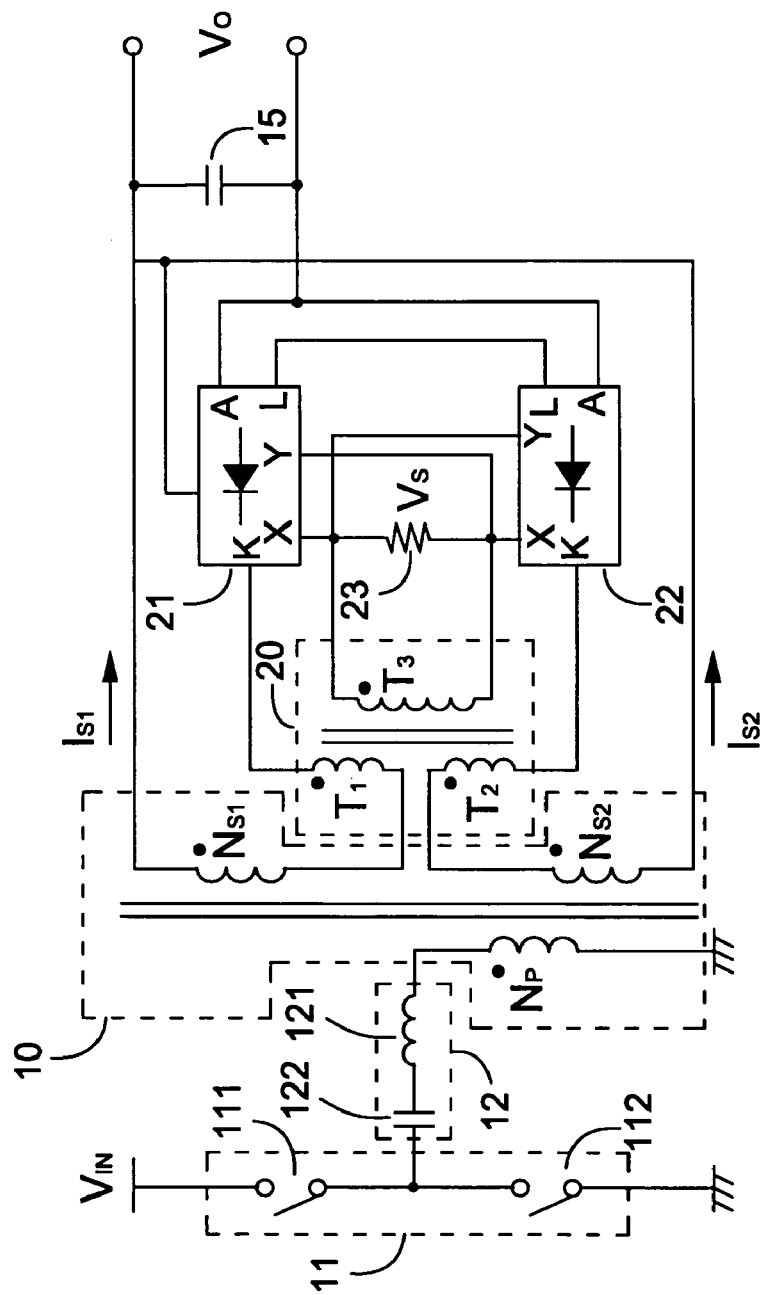
FIG. 2 shows a circuit diagram of a soft switching power converter with the synchronous rectifying circuit according to the present invention.

FIG. 2 shows a circuit diagram of a soft switching power converter with the synchronous rectifying circuit. The power converter includes a transformer 10 having a primary winding $N_P$ and secondary windings $N_{S1}$, $N_{S2}$, a half bridge circuit 11, a resonant tank 12, a capacitor 15, a current transformer 20, two integrated synchronous rectifiers 21, 22 and a resistor 23. The half bridge circuit 11 includes two switches 111 and 112. The resonant tank 12 includes an inductor 121 and a capacitor 122. The switches 111 and 112 switch the primary winding $N_P$ of the transformer 10. The current transformer 20 has two input windings $T_1$, $T_2$ and an output winding $T_3$. The integrated synchronous rectifier 21 has a cathode terminal K connected to the secondary winding $N_{S1}$ through the input winding $T_1$ of the current transformer 20. An anode terminal A of the integrated synchronous rectifier 21 is connected to the output ground of the power converter. The integrated synchronous rectifier 22 having a cathode terminal K and an anode terminal A is also connected from the secondary winding $N_{S2}$ to the output ground of the power converter through the input winding $T_2$ of the current transformer 20. The integrated synchronous rectifier 21 and the integrated synchronous rectifier 22 include an input-signal terminal X and an input-signal terminal Y respectively, which are connected to the output winding $T_3$ of the current transformer 20 to receive a switching-current signal $V_S$. The switching-current signal $V_S$ is generated by the resistor 23 and the switching currents $I_{S1}$ and $I_{S2}$ of the transformer 10. The switching-current signal $V_S$ is correlated to the switching currents $I_{S1}$ and $I_{S2}$ of the transformer 10. The switching-current signal $V_S$ is expressed as, $$V_S = I_{S1} \times \frac{N_{T1}}{N_{T3}} \times R_{23} \qquad (2)$$

$$V_S = I_{S2} \times \frac{N_{T2}}{N_{T3}} \times R_{23} \qquad (3)$$

where the $N_{T1}$, $N_{T2}$ and $N_{T3}$ are winding turns of the windings $T_1$, $T_2$ and $T_3$ respectively; the $R_{23}$ is the resistance of the resistor 23.

The switching-current signal $V_S$ is a differential signal. The polarity of the switching-current signal $V_S$ determines turning on or turning off of the integrated synchronous rectifiers 21 and 22. The integrated synchronous rectifiers 21 and 22 also generate an inner-lock signal $S_L$, not shown, on the inner-lock terminal L to prevent the integrated synchronous rectifiers 21 and 22 from turning on simultaneously. The integrated synchronous rectifier 21 and 22 are disabled once the amplitude of the switching-current signal $V_S$ is lower than a threshold voltage or a supply voltage $V_{CC}$ of the integrated synchronous rectifier 21, 22 is lower than a $V_{CC}$ threshold.

Figure 3:
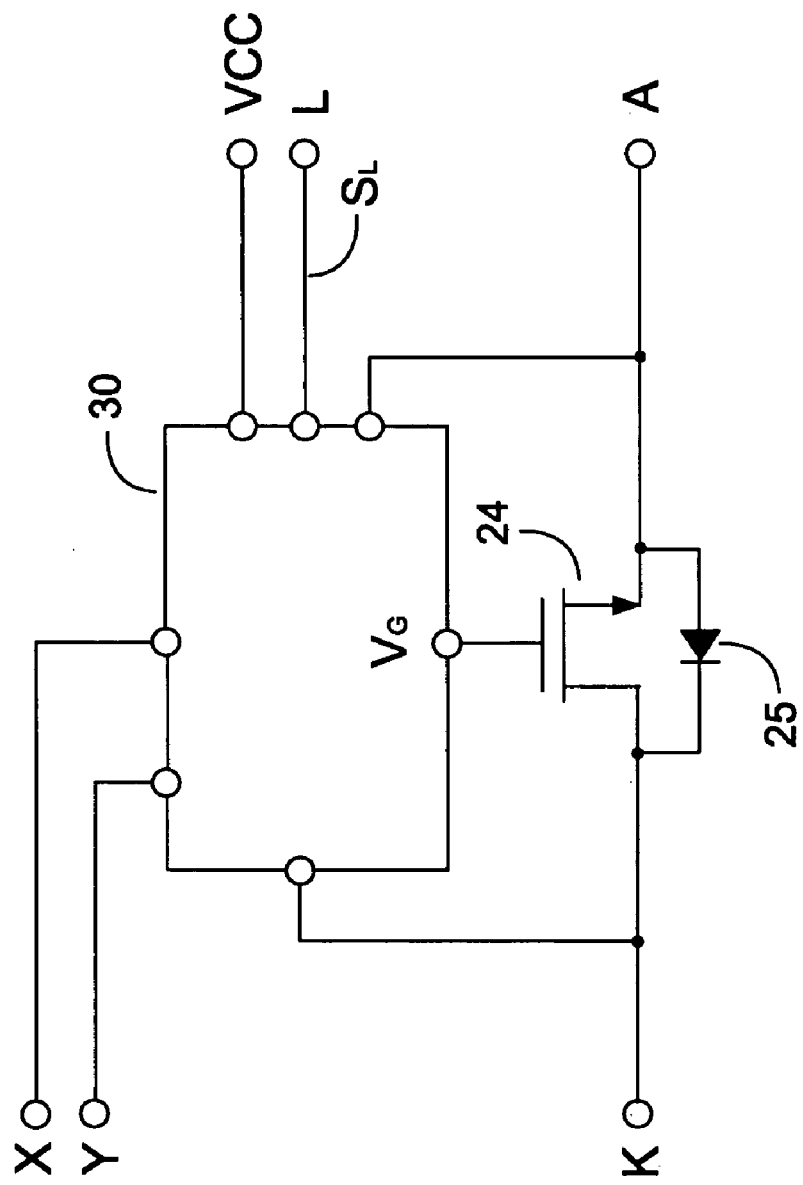
FIG. 3 is a schematic diagram of an integrated synchronous rectifier according to an embodiment of the present invention.

FIG. 3 is the schematic diagram of the integrated synchronous rectifier 21 or 22. The integrated synchronous rectifier 21 or 22 includes a power transistor 24, a diode 25 and a controller 30. The diode 25 is connected to the power transistor 24 in parallel. The diode 25 is a Schottky diode or a parasitic device of the power transistor 24. The power transistor 24 is connected between the cathode terminal K and the anode terminal A. The cathode terminal K is coupled to the secondary winding $N_{S1}$ or $N_{S2}$ of the transformer 10. The anode terminal A is coupled to the output of the power converter. The controller 30 receives the switching-current signal $V_S$ via the input-signal terminals X and Y for turning on or turning off the power transistor 24. A power source terminal VCC is utilized to supply the power source to the controller 30. The inner-lock terminal L outputs the inner-lock signal $S_L$ to show the on/off of the power transistor 24.

Figure 4:
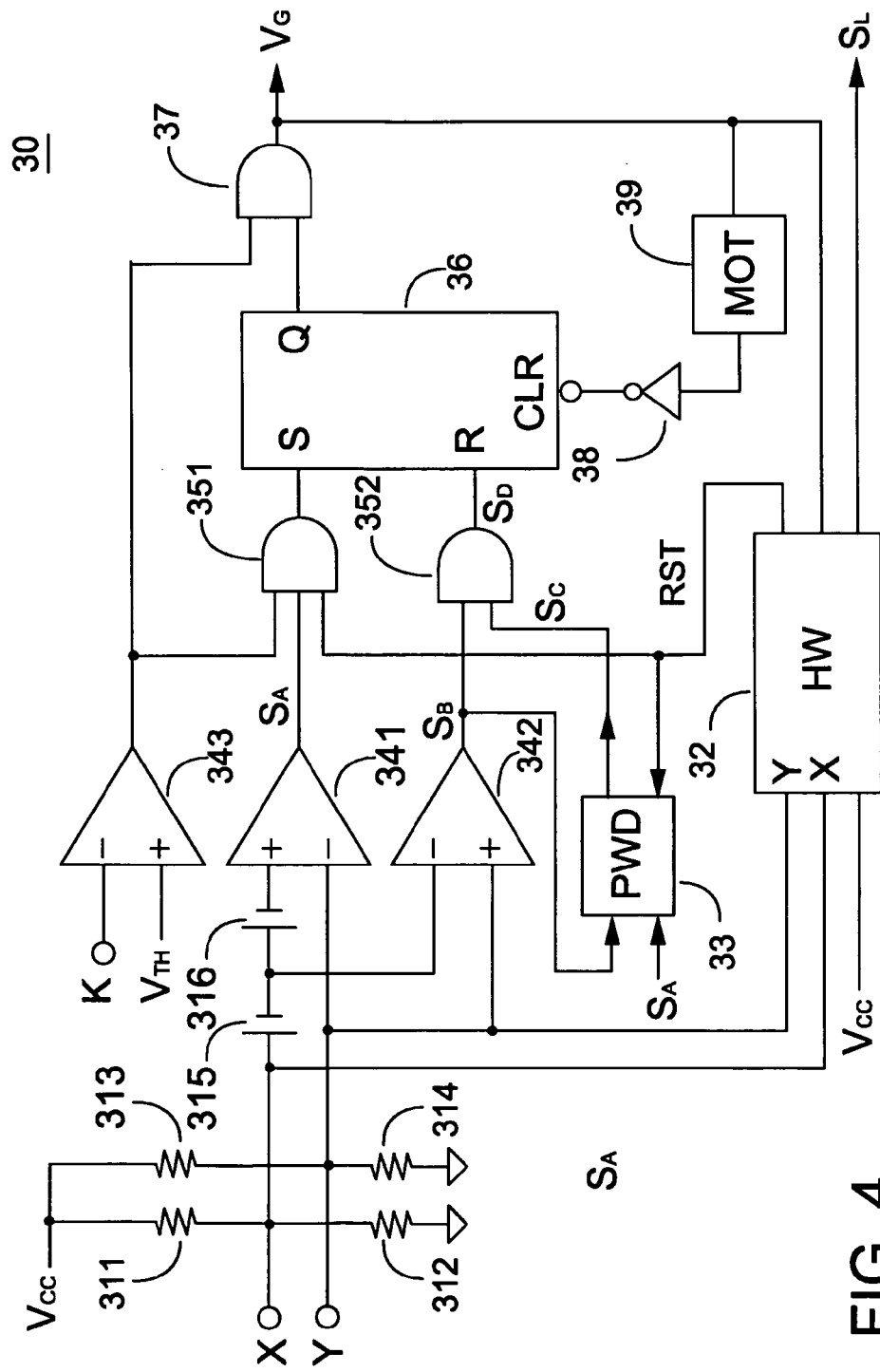
FIG. 4 is a circuit diagram of a controller of the integrated synchronous rectifier according to the present invention.

FIG. 4 shows a schematic diagram of a preferred embodiment of the controller 30. The controller 30 includes resistors 311, 312, 313 and 314, two offset voltage sources 315, 316, three comparators 341, 342, 343, three AND gates 351, 352, 37, a SR flip-flop 36 operated as a latch circuit, a pulse-width detection circuit 33, a maximum-on-time circuit (MOT) 39, a pulse-width detection circuit 33, a monitor circuit 300 and an inverter 38. The resistors 311 and 312 provide a bias termination for the input-signal terminal X. The resistors 313 and 314 provide another bias termination for the input-signal terminal Y. The input-signal terminal X is coupled to the positive input of a comparator 341 through the offset voltages 315 and 316. The offset voltages 315 and 316 are coupled in serial. The input-signal terminal X is connected to the negative input of the comparator 342 via the offset voltage source 315. The input-signal terminal Y is connected to the positive input of the comparator 342 and the negative input of the comparator 341. The offset voltage sources 315 and 316 produce hysteresis. The comparator 343 receives a threshold $V_{TH}$ from the positive input. The negative input of the comparator 343 is coupled to the cathode terminal K. The output of comparator 343 is coupled to the input of the AND gate 351. The output of comparator 341 generates a start signal $S_A$ to the input of the AND gate 351. The output of the AND gate 351 is coupled to the set-input terminal S of the SR flip-flop 36. The reset-input terminal R of the SR flip-flop 36 is controlled by the output of the AND gate 352. The output of the comparator 342 generates a stop signal $S_B$. The pulse-width detection circuit 33 generates a pulse signal $S_C$ in response the start signal $S_A$ and the stop signal $S_B$. The stop signal $S_B$ and the pulse signal $S_C$ are transmitted to the inputs of the AND gate 352.

The output Q of the SR flip-flop 36 and the output of the comparator 343 are connected to the AND gate 37. A drive signal $V_G$ is generated at the output of the AND gate 37 for controlling the power transistor 24, shown in FIG. 3. The maximum on time of the drive signal $V_G$ is limited by the maximum-on-time circuit 39. The drive signal $V_G$ is transmitted to the input of the maximum-on-time circuit 39. After a blanking time, a maximum-on-time signal $S_M$ is produced in response to the enable of the drive signal $V_G$. The maximum-on-time signal $S_M$ is transmitted to the clear terminal CLR of the SR flip-flop 36 to clear the SR flip-flop 36 via the inverter 38. The maximum on time of the drive signal $V_G$ is thus limited by the blanking time of the maximum-on-time circuit 39. The drive signal $V_G$ turns on the power transistor 24 once the following equations (4) and (5) are met, $$V_X - V_Y > V_{315} + V_{316} \qquad (4)$$

$$V_K < V_{TH} \qquad (5)$$

where $V_X$ is the voltage of the input-signal terminal X;
$V_Y$ is the voltage of the input-signal terminal Y;
$V_K$ is the voltage of the cathode terminal K;
$V_{315}$ is the voltage of the offset voltage source 315; and
$V_{316}$ is the voltage of the offset voltage source 316.

The drive signal $V_G$ will turn off the power transistor 24 when the switching-current signal $V_S$ is lower than $V_{315}$.

$$V_X - V_Y < V_{315} \qquad (6)$$

The start signal $S_A$ is enabled once the switching-current signal $V_S$ is higher than a first threshold ($V_{315}+V_{316}$). The stop signal $S_B$ is enabled when the switching-current signal $V_S$ is lower than a second threshold ($V_{315}$). Please also refer to FIG. 3, the start signal $S_A$ enables the drive signal $V_G$ for turning on the power transistor 24. The stop signal $S_B$ disables the drive signal $V_G$ for turning off the power transistor 24. The voltage of the cathode terminal K is lower than the voltage of the threshold $V_{TH}$ once the diode 25 is conducted and forward biased. Therefore, the power transistor 24 only can be turned on after the diode 25 is turned on, which achieves the soft-switching of the power transistor 24. Furthermore, the drive signal $V_G$ is disabled and the power transistor 24 is turned off when the diode 25 is reversely biased. The monitor circuit 32 detects the inner-lock signal $S_L$, the switching-current signal $V_S$ and the supply voltage $V_{CC}$ for generating a reset signal RST. The reset signal RST is transmitted to the pulse-width detection circuit 33 for generating the pulse signal $S_C$. Another input of the AND gate 351 is also coupled to receive the reset signal RST. Therefore, the power transistor 24 is disabled when the amplitude of the switching-current signal $V_S$ is lower than a threshold voltage or the supply voltage $V_{CC}$ is lower than a $V_{CC}$ threshold.

Figure 5:
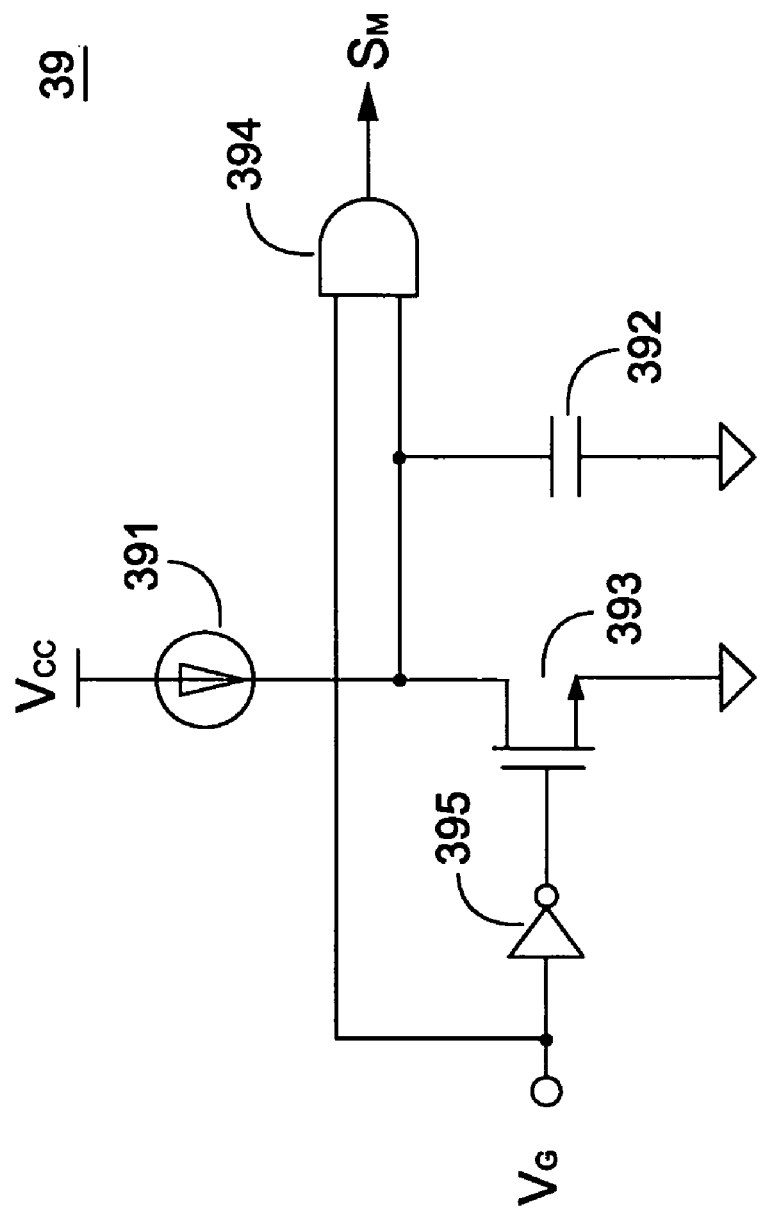
FIG. 5 is a circuit diagram of the maximum-on-time circuit according to an embodiment of the present invention.

FIG. 5 is the circuit diagram of the maximum-on-time circuit 39. The maximum-on-time circuit 39 includes a current source 391, a capacitor 392, a transistor 393, an AND gate 394 and an inverter 395. The current source 391 is connected to the capacitor 392 and charges the capacitor 392. The transistor 393 is connected to the capacitor 392 and discharges the capacitor 392. The drive signal $V_G$ controls the transistor 393 through the inverter 395. The drive signal $V_G$ is further transmitted to an input of the AND gate 394. Another input of the AND gate 394 is coupled to the capacitor 392. Once the drive signal $V_G$ is enabled, the output of the AND gate 394 generates the maximum-on-time signal $S_M$ to disable the drive signal $V_G$ after the blanking time. The blanking time is determined by the current of the current source 391 and the capacitance of the capacitor 392.

Figure 6:
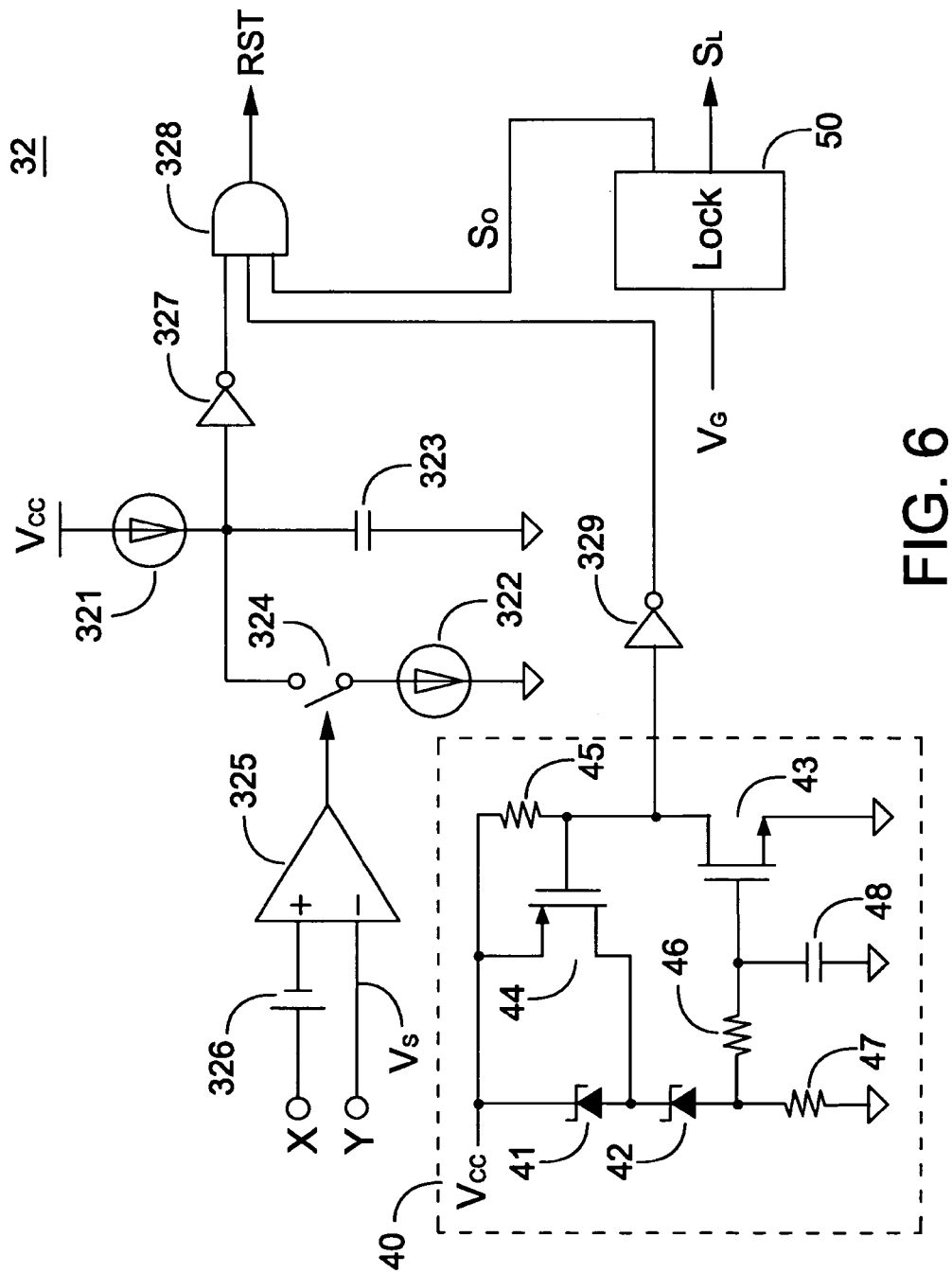
FIG. 6 is a circuit diagram of a monitor circuit according to the present invention.

FIG. 6 shows a preferred embodiment of the monitor circuit 32. The monitor circuit 32 includes two current sources 321, 322, a capacitor 323, a switch 324, comparator 325, a threshold voltage 326, two inverters 327, 329, an AND gate 328, an inner-lock circuit 50 and a $V_{CC}$-detection circuit 40. The current sources 321, 322 and the capacitor 323 form a debounce circuit. The current source 321 is applied to charge the capacitor 323 and the current source 322 is applied to discharge the capacitor 323 through the switch 324. The on/off of the switch 324 is controlled by the comparator 325. The positive input of the comparator 325 is coupled to the input-signal terminal X through the threshold voltage 326. The negative input of the comparator 325 is connected to the input-signal terminal Y to receive the switching-current signal $V_S$. Therefore, the switch 324 is turned off and the capacitor 323 is charged when the switching-current signal $V_S$ is smaller (lower) than a voltage of the threshold voltage 326 (third threshold voltage). Once the debounce period is reached, the reset signal RST will be disabled (logic high). The input of the inverter 327 is connected to the capacitor 323. The output of the inverter 327 is connected to one input of the AND gate 328. The output of the AND gate 328 generates the reset signal RST. Another input of the AND gate 328 is connected to a $V_{CC}$-detection circuit 40 through the inverter 329. The $V_{CC}$-detection circuit includes transistors 43, 44, zener diodes 41, 42, resistors 45, 46, 47 and a capacitor 48. When the supply voltage $V_{CC}$ is higher than the voltage of zener diodes 41 and 42, a signal on resistor 47 will turn on the transistor 43. The resistor 46 and the capacitor 48 are utilized to filter the noise. The output of the transistor 43 is connected to the input of the inverter 329 and the transistor 44. The resistor 45 provides the bias for the transistor 44. The transistor 44 is conducted to short circuit the zener diode 41 once the transistor 43 is turned on. After that, the transistor 43 is turned off when the VCC supply voltage $V_{CC}$ is lower than the voltage of zener diode 42. Therefore, the reset signal RST will be disabled (logic high) when the amplitude of the switching-current signal $V_S$ is lower than the voltage of the threshold voltage 326 or the supply voltage $V_{CC}$ is lower than the voltage of zener diode 42. The other input of the AND gate 328 receives an output signal $S_O$ from the inner-lock circuit 50. The inner-lock circuit 50 generates the inner-lock signal $S_L$ in response to the enable of the drive signal $V_G$. The drive signal $V_G$ only can be initiated once the inner-lock signal $S_L$ is disabled.

Figure 7:
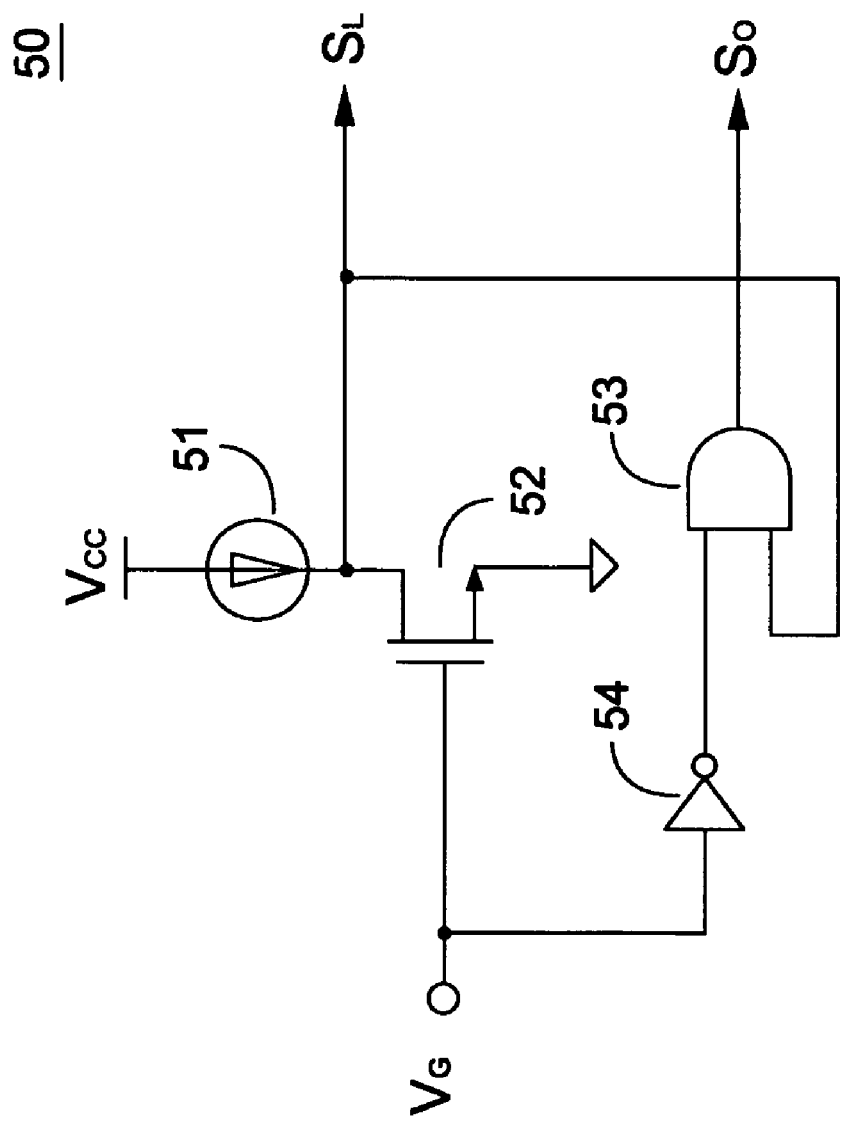
FIG. 7 shows a circuit diagram of an inner-lock circuit of the controller according to the present invention.

FIG. 7 shows the inner-lock circuit 50. The inner-lock circuit 50 includes a current source 51, a transistor 52, an AND gate 53 and an inverter 54. The current source 51 associates with the transistor 52 to generate the inner-lock signal $S_L$. The drive signal $V_G$ controls the transistor 52 and the inverter 54. The output signal $S_O$ is generated by the AND gate 53. The inputs of the AND 53 gate are coupled to the inner-lock terminal L and the output of the inverter 54.

Figure 8:
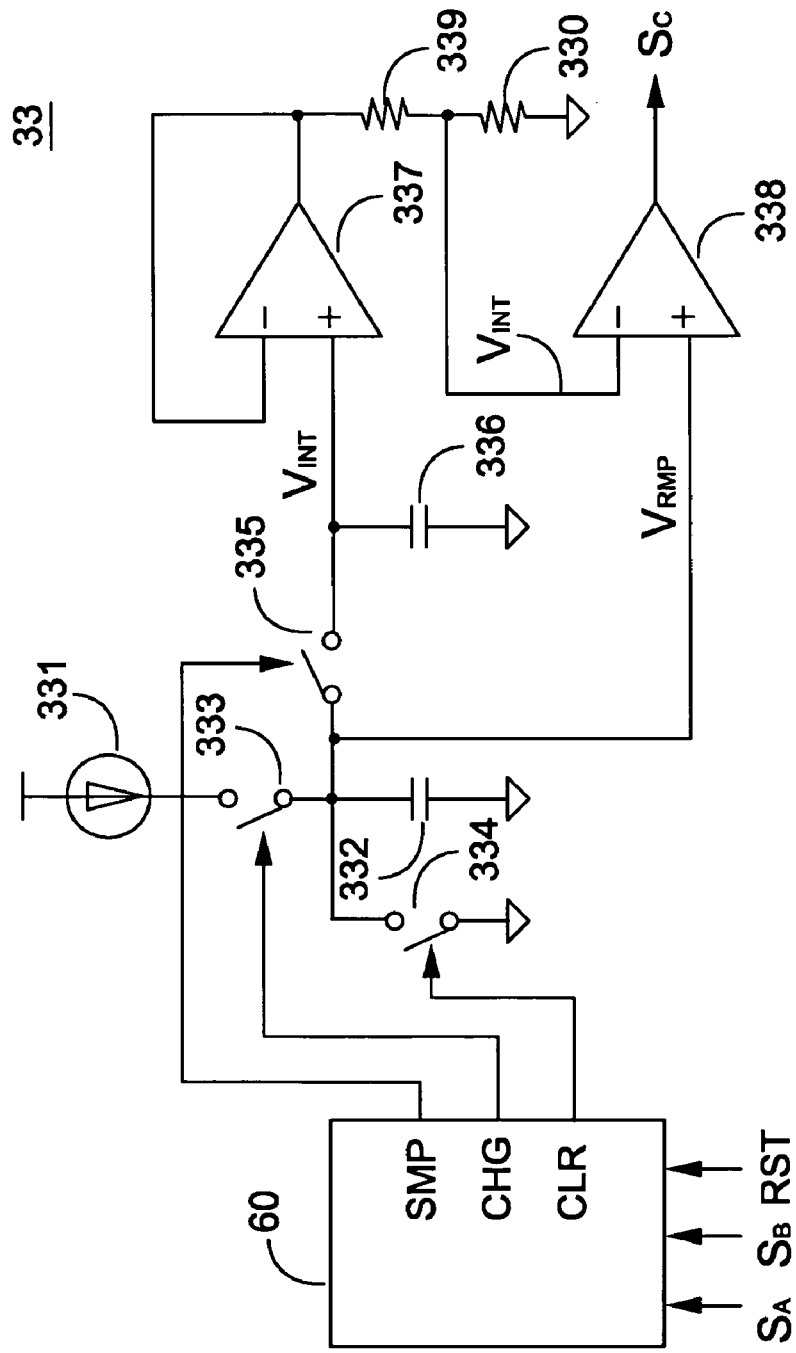
FIG. 8 is a circuit diagram of a pulse-width detection circuit according to the present invention.

FIG. 8 shows the circuit schematic of the pulse-width detection circuit 33. The plus-wide detection circuit 33 includes a signal generator 60, a current source 331, two capacitors 332, 336, three switches 333, 334 and 335, a buffer amplifier 337, a comparator 338 and two resistors 330, 339. The pulse-width detection circuit 33 generates an integration signal $V_{INT}$, a ramp signal $V_{RMP}$ and the pulse signal $S_C$. The integration signal $V_{INT}$ is generated in accordance with the period of the start signal $S_A$ and the stop signal $S_B$. The ramp signal $V_{RMP}$ is generated in response to the start signal $S_A$. The pulse signal $S_C$ is generated by comparing the integration signal $V_{INT}$ and the ramp signal $V_{RMP}$. The pulse signal $S_C$ disables the drive signal $V_G$ and turns off the power transistor 24, see FIG. 3. The current source 331 charges the capacitor 332 via the switch 333. The capacitor 332 is coupled to another capacitor 336 through the switch 335. Therefore, the signal of the capacitor 332 is transferred to the capacitor 336 when the switch 335 is on. The ramp signal $V_{RMP}$ is generated on the capacitor 332. The integration signal $V_{INT}$ is generated on the capacitor 336. The switch 334 is connected to the capacitor 332 in parallel for the discharge. The signal generator 60 is used to generate a charge signal CHG, a clear signal CLR and a sample signal SMP. The charge signal CHG controls the switch 333. The clear signal CLR controls the switch 334. The sample signal SMP controls the switch 335. The charge signal CHG is enabled by the start signal $S_A$ and disabled by the stop signal $S_B$. Therefore, the pulse width of the charge signal CHG is proportional to the pulse width of the switching-current signal $V_S$. The maximum amplitude of the ramp signal $V_{RMP}$ is thus proportional to pulse width of the charge signal CHG. The ramp signal $V_{RMP}$ is generated and ramping up in response to the enable of the charge signal CHG. The sample signal SMP is generated following the disable of the charge signal CHG. The ramp signal $V_{RMP}$ is therefore transferred to the capacitor 336 to produce the integration signal $V_{INT}$. The amplitude of the integration signal $V_{INT}$ is proportional to the period between the start signal $S_A$ and the stop signal $S_B$. That means the amplitude of the integration signal $V_{INT}$ is proportional to the period of the switching-current signal $V_S$. The integration signal $V_{INT}$ also represents previous switching information. The integration signal $V_{INT}$ is coupled to the comparator 338 through the buffer amplifier 337 and the resistors 339, 330. The resistors 339 and 330 form a divider to provide attenuation. Another input of the comparator 338 receives the ramp signal $V_{RMP}$ for generating the pulse signal $S_C$. The pulse signal $S_C$ is enabled once the ramp signal $V_{RMP}$ is higher than integration signal $V_{INT}$. The pulse signal $S_C$ is generated before the enablement of the stop signal $S_B$. The clear signal CLR is generated right after the disablement of the sample signal SMP. The capacitor 332 is thus cleared after the sampling.

Figure 9:
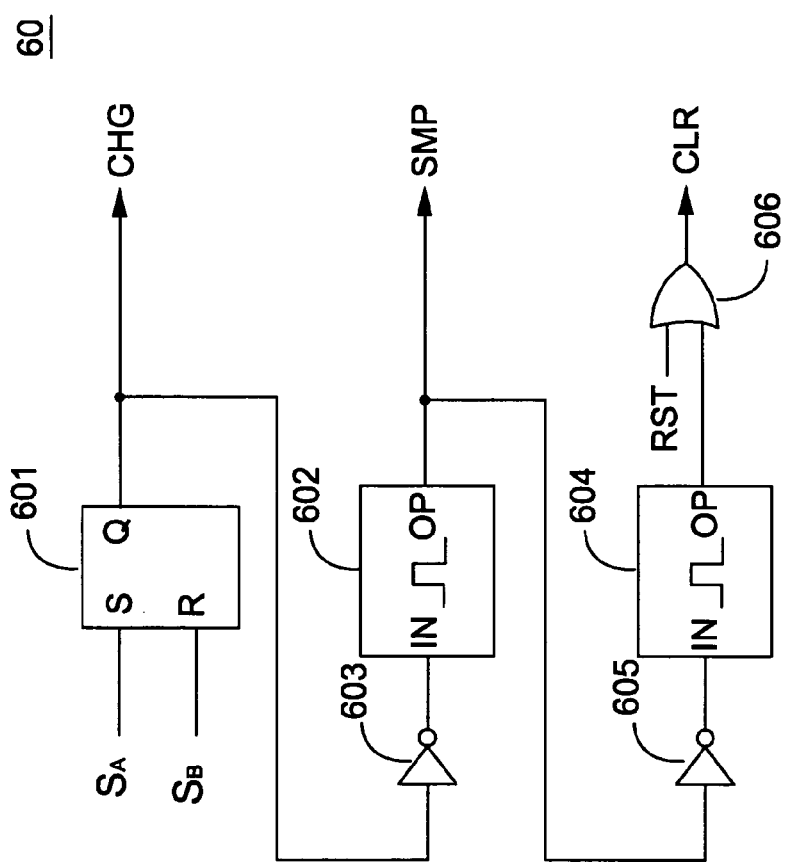
FIG. 9 shows a circuit diagram of the signal generator of the pulse-width detection circuit according to the present invention.

FIG. 9 shows the circuit diagram of the signal generator 60. The signal generator 60 includes a flip-flop 601, two one-shot circuits 602, 604, two inverters 603, 605 and an OR gate 606. The flip-flop 601 is used to generate the charge signal CHG. The start signal $S_A$ is transmitted to the set terminal S of the flip-flop 601. The stop signal $S_B$ is transmitted to the reset terminal R of the flip-flop 601. The charge signal CHG is transmitted to the one-shot circuit 602 through the inverter 603. The one-shot circuit 602 generates the sample signal SMP to another one-shot circuit 604 via the inverter 605. The output of the one-shot circuit 604 is connected to the OR gate 606. Another input of the OR gate 606 receives the reset signal RST. The output of the OR gate 606 generates the clear signal CLR.

Figure 10:
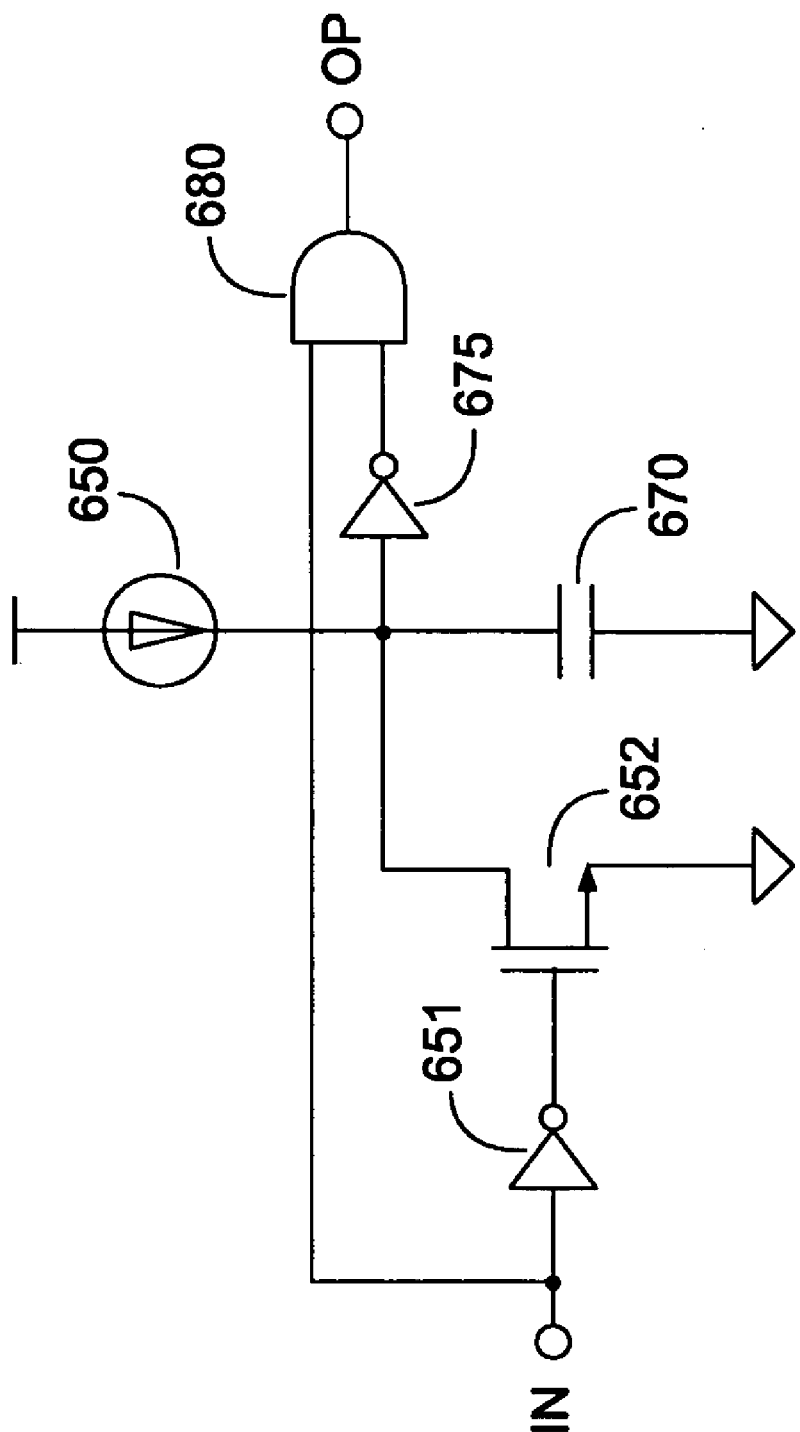
FIG. 10 shows a circuit diagram of the one-shot circuit of the signal generator.

The example circuit diagram of the one-shot circuits 620 and 630 is shown in FIG. 10. A current source 650 is connected to a capacitor 670 and charges the capacitor 670 in response to the logic-high of the input signal IN. The input signal IN discharges the capacitor 670 through an inverter 651 and a transistor 652. The input signal IN is further transmitted to an AND gate 680. Another input of the AND gate 680 is connected to the capacitor 670 via an inverter 675. Therefore the AND gate 680 generates a one-shot output signal OP in response to the logic-high of the input signal IN. The pulse width of the one-shot output signal OP is determined by the current of the current source 650 and the capacitance of the capacitor 670.

Figure 11:
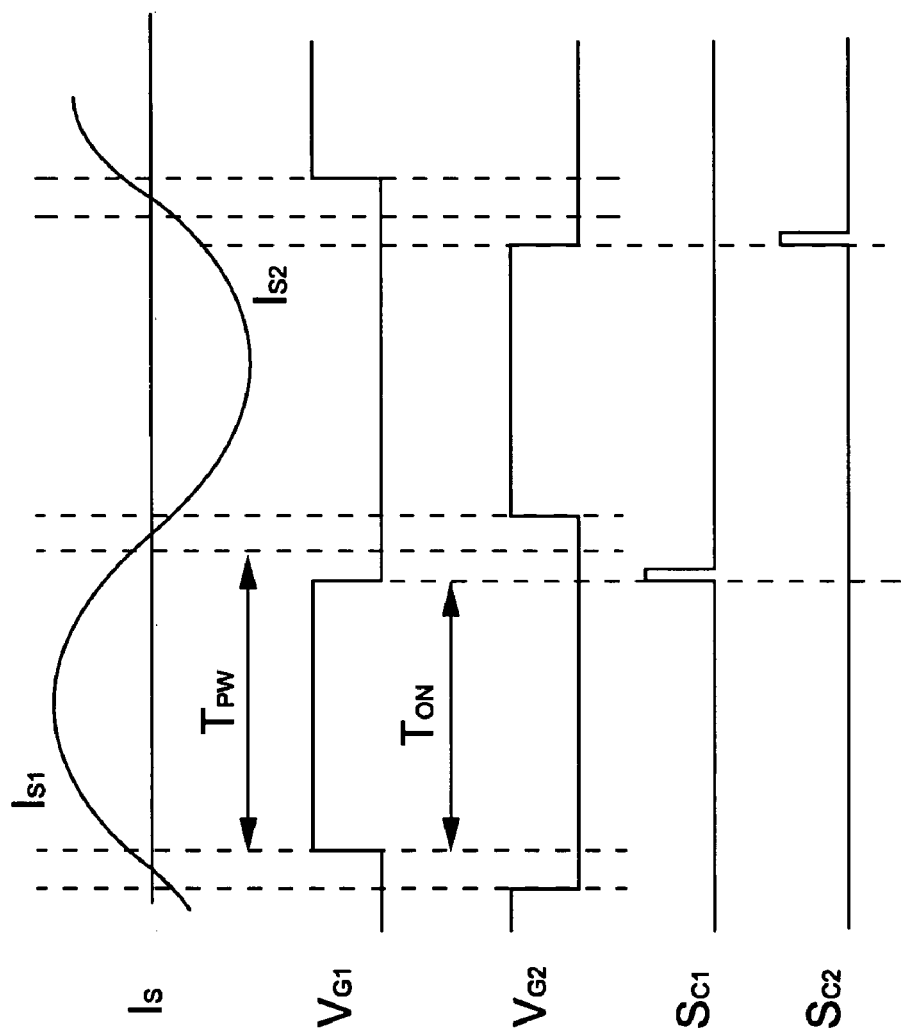
FIG. 11 shows a waveforms diagram of the synchronous rectifying according to the present invention.

FIG. 11 shows a waveforms diagram of the synchronous rectifying. The switching-current signal $V_S$ is generated in response to the switching current $I_S$ of the transformer 10 including $I_{S1}$ and $I_{S2}$. The pulse width of $T_{PW}$ shows the period between the start signal $S_A$ and the stop signal $S_B$. The drive signals $V_{G1}$ and $V_{G2}$ are the drive signal $V_G$ of the integrated synchronous rectifier 21 and the integrated synchronous rectifier 22 respectively. The drive signal $V_{G1}$ is disabled by the pulse signal $S_{C1}$. The drive signal $V_{G2}$ is disabled by the pulse signal $S_{C2}$. The pulse width $T_{ON}$ of the drive signals $V_{G1}$ and $V_{G2}$ are shorter than the pulse width of $T_{PW}$.

Figure 12:
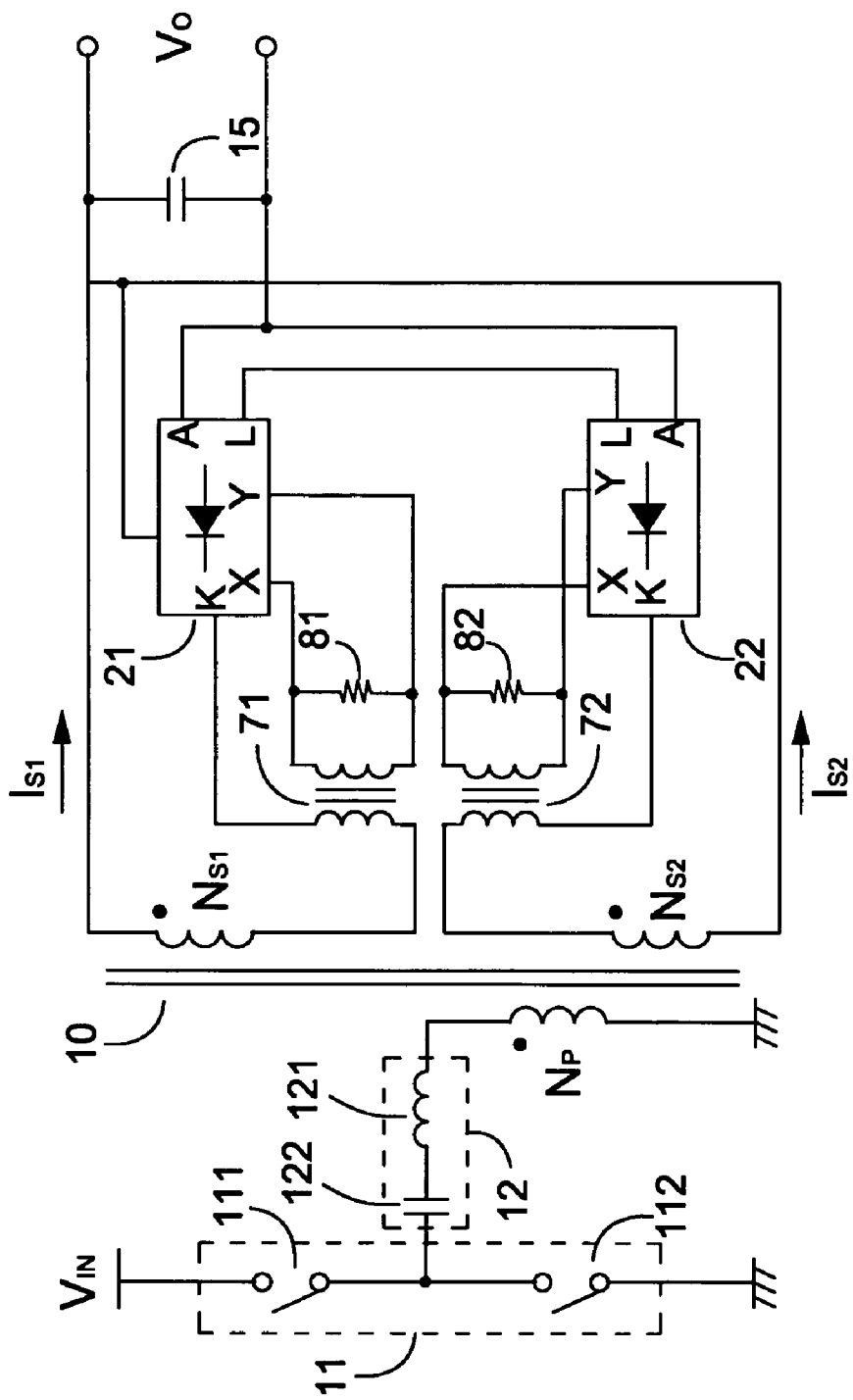
FIG. 12 is a circuit diagram of the soft switching power converter with another preferred embodiment of the integrated synchronous rectifying circuit according to the present invention.

FIG. 12 shows another preferred embodiment of the integrated synchronous rectifying circuit, in which two current transformers 71 and 72, resistors 81 and 82 are used for converting the switching currents $I_{S1}$ and $I_{S2}$ to switching-current signal $V_S$.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A synchronous rectifying circuit of soft switching power converter with a transformer, comprising:
    a current transformer generating a switching-current signal in response to the switching of the transformer; and
    an integrated synchronous rectifier comprising:
        a power transistor coupled to the transformer and an output of the power converter for the rectifying; and
        a controller generating a drive signal to control the power transistor directly in response to the switching-current signal; wherein the controller generates a start signal when the switching-current signal is higher than a first threshold; the controller generates a stop signal when the switching-current signal is lower than a second threshold; the start signal is coupled to enable the drive signal to turn on the power transistor; the stop signal is coupled to disable the drive signal to turn off the power transistor;
        wherein the controller comprises a pulse-width detection circuit generating an integration signal, a ramp signal and a pulse signal; wherein the integration signal is generated in accordance with a period between the start signal and the stop signal, the ramp signal is generated in response to the start signal, the pulse signal is generated by comparing the integration signal and the ramp signal to disable the driver signal and turn off the power transistor.

2. The synchronous rectifying circuit of claim 1, wherein the controller comprises an inner-lock circuit generating an inner-lock signal in response to the enablement of the drive signal;
    wherein the drive signal is initiated when the inner-lock signal is disabled.

3. The synchronous rectifying circuit of claim 1, wherein the controller comprises a maximum-on-time circuit generating a maximum-on-time signal, wherein the maximum-on-time signal is coupled to turn off the power transistor for limiting a maximum on-time of the power transistor.

4. The synchronous rectifying circuit of claim 1, wherein the controller further comprises:
    a latch circuit generating the drive signal to control of the power transistor; and
    a plurality of comparators generating a start signal and a stop signal coupled to set or rest the latch;
    wherein the drive signal is enabled when the switching-current signal is higher than the first threshold; the drive signal is disabled when the switching-current signal is lower than the second threshold.

5. The synchronous rectifying circuit of claim 1, wherein the controller comprises a monitor circuit for generating a reset signal, wherein the reset signal is coupled to disable the power transistor when amplitude of the switching-current signal is lower than a third threshold voltage.

6. The synchronous rectifying circuit of claim 1, further comprising a diode connected to the power transistor in parallel, and the power transistor is turned on after the diode is on.

7. A method of synchronous rectifying for a soft switching power converter, the soft switching power converter including a transformer, comprising:
    generating a switching-current signal in response to a switching current of the transformer;
    setting or resetting a latch in response to the switching-current signal; and
    turning on/off a power transistor in accordance with a status of the latch;
    wherein the power transistor is coupled to the transformer and an output of the power converter for rectifying, and the switching-current signal is generated in response to the switching current of the transformer;
    wherein further comprises a step of generating an integration signal, a ramp signal and a pulse signal; the integration signal is generated in accordance with a period of the switching-current signal, the ramp signal is generated in response to enable of the switching-current signal, and the pulse signal is generated by comparing the integration signal and the ramp signal to turn off the power transistor.

8. The method according to claim 7, further comprising:
    generating an inner-lock signal in response to the enable of a drive signal;
    wherein the driver signal is initiated when the inner-lock signal is disabled.

9. The method according to claim 7, further comprising:
    generating a maximum-on-time signal in response to the turn on of the power transistor, wherein the maximum-on-time signal turns off the power transistor for limiting a maximum on-time of the power transistor.

10. The method according to claim 7, further comprising:
    generating a reset signal to disable the power transistor when the switching-current signal is lower than a voltage threshold.

11. The method according to claim 7, further comprising:
generating a reset signal to disable the power transistor when a supply voltage of the latch is lower than a VCC threshold.

12. The method according to claim 7, further comprising:
generating a pass signal for allowing the enable of the power transistor;
wherein the pass signal is generated when a diode is conducted; the diode is connected in parallel to the power transistor.

* * * * *